US006789089B2

(12) United States Patent
Scoggins

(10) Patent No.: US 6,789,089 B2
(45) Date of Patent: Sep. 7, 2004

(54) AUTOMATED PLANNING METHOD

(76) Inventor: Timothy N. Scoggins, 9647 Quail Hollow Blvd., Pensacola, FL (US) 32514

( * ) Notice: Subject to any disclaimer, the term of this patent is extended or adjusted under 35 U.S.C. 154(b) by 488 days.

(21) Appl. No.: 09/817,493

(22) Filed: Mar. 26, 2001

(65) Prior Publication Data

US 2002/0143789 A1 Oct. 3, 2002

(51) Int. Cl.[7] .............................................. G06F 17/30
(52) U.S. Cl. ..................... 707/104; 707/10; 707/101; 707/102; 707/103; 709/203
(58) Field of Search ..................... 707/10, 102, 104, 707/101, 103; 709/203

(56) References Cited

U.S. PATENT DOCUMENTS

| 6,393,423 B1 | * | 5/2002 | Goedken | 707/10 |
| 2001/0047310 A1 | * | 11/2001 | Russell | 705/26 |
| 2002/0049743 A1 | * | 4/2002 | Hall | 707/1 |
| 2003/0110215 A1 | * | 6/2003 | Joao | 709/203 |

OTHER PUBLICATIONS

Bates et al., Industry survey for the University of Alabama at Birmingham (UAB) 2005 Electrical Engineering Curriculum Study, IEEE, 1994, pp. 242–244.*
Shepstone, "the influence of eurocentricity on engineering courses and approach to their transformation", IEEE, 1996, pp. 928–931.*
Parnaby, "the requirements for engineering degree courses and graduate engineers: an industrial viewpoint", IEEE, 1998, pp. 181–187.*

* cited by examiner

Primary Examiner—Thuy N. Pardo
(74) Attorney, Agent, or Firm—Peter Loffler

(57) ABSTRACT

A computer-based automated planning method utilizes a record for an individual which record contains achievements obtained from one or more sources. Each achievement is translated into a course equivalent for each institution and each course equivalent for a particular institution is matched against a degree requirement list for the institution and a listing is made of all requirements that have been met and all requirements that have yet to be made.

34 Claims, 18 Drawing Sheets

| Ace Id No | Branch | Beg Date | End Date | Mos Rating Title | Skill Level |
|---|---|---|---|---|---|
| MOS-11B-005 | ARMY | 02/87 | 05/89 | INFRANTRYMAN | 10 |
| MOS-12B-001 | ARMY | 04/93 | 11/97 | COMBAT ENGINEER | 30 |
| MOS-12B-001 | ARMY | 12/97 | 00/00 | COMBAT ENGINEER | 40 |
| MOS-12C-002 | ARMY | 06/89 | 03/93 | BRIDGE CREWMAN | 20 |
| MOS-79T-001 | ARMY | 01/99 | 00/00 | RECRUITER/RETENTION NCO | 40 |

Figure 3

| Branch | Ace Id No | Title | Course No | End Date | Length | |
|---|---|---|---|---|---|---|
| ARMY | AR-1406-0188 | 79T BASIC COURSE | 501-79T20 | 12/98 | 6 | WKS |
| ARMY | AR-1601-0070 | COMBAT ENGINEER | 12B10-OSUT | 06/89 | 12 | WKS |
| ARMY | AR-1601-0082 | COMBAT ENGINEERING ADVAN | 0-12-C42 | 07/97 | 10 | WKS |
| ARMY | AR-2201-0253 | PRIMARY LEADERSHIP | 600-00-PLD | 05/94 | 04 | WKS |

| | | | | | |
|---|---|---|---|---|---|
| Applicants:1 | | | | | |
| SSN | 987-65-4321 | LastName | PUBLIC | FirstName | JOHN |

List | Application | Notes | Operations | Search | Clear Criteria 987-65-4321  PUBLIC, JOHN Q.  Anywhere, FL 32509

Applicant | Service | MOS | Mil Training | Mil Corres. | College Courses | Testing | Certs.

| College | Course No | Title | Sem Hrs | Level |
|---|---|---|---|---|
| ▲ Abe Lincoln Community College | BUS 0101 | Introduction to Business | 3.00 | LL |
| Abe Lincoln Community College | BUS 0112 | Introduction to Computers | 3.00 | LL |
| Abe Lincoln Community College | CHEM 1061 | Principles of Chemistry | 4.00 | LL |
| Abe Lincoln Community College | ECON 0101 | Survey of Economics | 3.00 | LL |
| Abe Lincoln Community College | ECON 0102 | Principles of Economics I | 3.00 | LL |
| Abe Lincoln Community College | ENGL 0111 | Introduction to Composition/Ideas | 3.00 | LL |
| Abe Lincoln Community College | ENGL 0121 | Composition College Writing | 3.00 | LL |
| Abe Lincoln Community College | ENGL 2235 | American Literature II | 3.00 | LL |
| Abe Lincoln Community College | GEOG 1101 | Geography of the U.S. | 3.00 | LL |
| Abe Lincoln Community College | MAT-221 | College Algebra | 3.00 | UL |

```
STUDENT DATA:
NAME: JOHN PUBLIC                    SSN: 987-65-4321        RANK: Sergeant First Class The following information is extracted from the American Council on Education Guide to the
Evaluation of Educational Experiences in the Armed Services. The course records detail
information provided by the Army ACE Registered Transcript Service (AARTS).

MOS/RATING CREDIT:

BRIDGE CREWMAN                                                          (MOS-12C-002)
        Skill Level 20      12C20        (09/76 - 12/89)
SH:     UL/LL:  AREA OF APPLICATION:
        VOC     Vocational Credit, N/A to Degree Program BRIDGE CREWMAN                                                          (MOS-12C-002)
        Skill Level 20      12C20        (01/90 - 05/91)
SH:     UL/LL:  AREA OF APPLICATION:
                No academic credit that would apply to a degree RECRUITER/RETENTION NCO (NATIONAL GUARD)                                (MOS-79T-001)
        Skill Level 40      79T40        (02/97 - Present)
SH:     UL/LL:  AREA OF APPLICATION:
 3      LL      Social psychology
 3      LL      Audiovisual techniques
 3      LL      Marketing techniques
 3      LL      Public speaking
 3      LL      Record keeping
 3      LL      Personnel supervision
 1      LL      Computer application
 3      UL      Field experience in marketing
 3      UL      Records management
 3      UL      Personnel management
 3      UL      Vocational counseling
```

Figure 15

MILITARY TRAINING CREDIT:

79T BASIC COURSE (AR-1406-0188)

| SH: | UL/LL: | AREA OF APPLICATION: |
|---|---|---|
| 3 | LL | Salesmanship |
| 3 | LL | Human resource management |
| 2 | LL | Interpersonal communication |
| 1 | LL | Presentation skills |

COMBAT ENGINEER (AR-1601-0070)

| SH: | UL/LL: | AREA OF APPLICATION: |
|---|---|---|
|   |   | No academic credit that would apply to a degree |

COMBAT ENGINEERING ADVANCED NONCOMMISSIONED (AR-1601-0082)

| SH: | UL/LL: | AREA OF APPLICATION: |
|---|---|---|
| 2 | LL | General construction |
|   |   | See AR-1404-0035 for the Common Core |

PRIMARY LEADERSHIP DEVELOPMENT (AR-2201-0253)

| SH: | UL/LL: | AREA OF APPLICATION: |
|---|---|---|
| 2 | LL | Principles of supervision |
| 2 | LL | Military science |

TRADITIONAL COLLEGE CREDIT:

| SH: | UL/LL: | TITLE: | COLLEGE: |
|---|---|---|---|
| 3.00 | LL | Introduction to Business | Abe Lincoln Community College |
| 3.00 | LL | Introduction to Computers | Abe Lincoln Community College |
| 4.00 | LL | Principles of Chemistry | Abe Lincoln Community College |
| 3.00 | LL | Survey of Economics | Abe Lincoln Community College |
| 3.00 | LL | Principles of Economics I | Abe Lincoln Community College |
| 3.00 | LL | Introduction to Composition/Id | Abe Lincoln Community College |
| 3.00 | LL | Composition College Writing | Abe Lincoln Community College |
| 3.00 | LL | American Literature II | Abe Lincoln Community College |
| 3.00 | LL | Geography of the U.S. | Abe Lincoln Community College |
| 3.00 | UL | College Algebra | Abe Lincoln Community College |

NON-TRADITIONAL COLLEGE CREDIT:

| SH: | UL/LL: | TITLE: |
|---|---|---|
| 3.00 | LL | Afro-American History |

Figure 16

Degree Plan

Mytown State College
Bachelor of Science Degree

| Subject Groups/Courses | Required | Achieved |
|---|---|---|
| English Composition | 3 | |
|   EN (3 required) | | |
|     Introduction to Composition/Ideas | | 3 |
| Communication Arts/Humanities | 9 | |
|   HU (3 required) | | |
|     American Literature II | | 3 |
|   CO | | |
|     Composition College Writing | | 3 |
|     Public speaking | | 3 |
| Social Sciences/History | 6 | |
|   BS | | |
|     Survey of Economics | | 3 |
|   SH | | |
|     Principles of Economics I | | 3 |
| Natural Sciences/Mathematics | 9 | |
|   NS (3 required) | | |
|     Principles of Chemistry | | 4 |
|   MA (3 required) | | |
|     College Algebra | | 3 |
| Liberal Arts Electives | 33 | |
|   LA | | |
|     Geography of the U.S. | | 3 |
|     Afro-American History | | 3 |
|     Interpersonal communication | | |

Print | Re-Populate | Cancel

Figure 17

| Mytown State College, Pensacola, FL | Bachelor of Science Degree | | |
|---|---|---|---|
| STUDENT DATA:<br>NAME: JOHN PUBLIC    SSN: 987-65-4321 | | Sem Hrs<br>Requird | Sem Hrs<br>Achieved |
| Excess or Duplicate Credit | | | |
| NA | | | |
| English Composition | | 3 | 3.00 |
| (Must have 3 sh in English Composition, either a college course or the Excelsior English essay exam.) | | | |
| EN   (3 required) | | | |
|    Introduction to Composition/Ideas | | LL | 3.00 |
| Communication Arts/Humanities | | 9 | 9.00 |
| (Must have 3 sh in a fine arts discipline such as Art, Music, Philosophy, etc.) | | | |
| HU   (3 required) | | | |
|    American Literature II | | LL | 3.00 |
| CO | | | |
|    Composition College Writing | | LL | 3.00 |
|    Public speaking | | LL | 3.00 |
| Social Sciences/History | | 6 | 6.00 |
| BS | | | |
| SH | | | |
|    Survey of Economics | | LL | 3.00 |
|    Principles of Economics I | | LL | 3.00 |
| Natural Sciences/Mathematics | | 9 | 7.00 |
| (To meet the quatitative requirement, students must complete a course in one of the following areas: math, statistics, or logic) | | | |
| NS   (3 required) | | | |
|    Principles of Chemistry | | LL | 4.00 |
| MA   (3 required) | | | |
|    College Algebra | | UL | 3.00 |

Figure 18

AUTOMATED PLANNING METHOD

BACKGROUND OF THE INVENTION

1. Field of the Invention

The present invention relates to a computer-based planning method that translates an individual's achievements into a degree equivalent for an institution and lists all degree requirements that have been met and all degree requirements that have yet to be met.

2. Background of the Prior Art

Many individuals, such as members of the military, may earn achievements from a wide variety of sources. Such sources can include college work, specialized job training—either classroom or field work—correspondence course work, testing through a course, etc. A person having such diverse achievement sources has little problems with the achievements within the environment where such achievements were realized (e.g., the military will not have trouble understanding the achievement level of a soldier who has earned all recognized achievements within the military). However, if the individual desires to obtain an award of recognition (degree, diploma, certificate of achievement, certificate of qualification, license, etc.,) from an outside institution, and desires to know which requirements of the particular outside institution for the award of recognition have been met and which requirements have not been met, problems can arise.

As the outside institution did not grant many (if any) of the achievements earned by the individual, the institution may have trouble determining which requirements for a particular recognition award have been met and which requirements have not been met. The institution must take each earned achievement of the individual and translate the achievement into an equivalent requirement recognized by the institution. This process is time consuming and, as it involves large amounts of data, is subject to simple human errors in processing. If the individual is desirous of looking at more than one award of recognition for the particular institution, the problems are compounded. Such a method is prone to redundancy of task performance, especially if an individual seeks to check the requirements status for an award on a regular basis.

Therefore, there is a need in the art for a system that eliminates the above-noted problems. Such as system, which must be time and task efficient, must automatically take the earned achievements of an individual, which achievements can come from a wide variety of sources, and translate each achievement into an equivalent that can be used to satisfy the requirements for an award of recognition that is granted by an institution. As each institution may have different views as to what equivalency a specific achievement translates to for the particular institution, the system must perform a translation for each institution. The system must provide a listing of the requirements that have been met and the requirements that have yet to be met for a selected award of recognition for a particular institution. Ideally, the system must be relatively simple to use and operate. As new achievements as well as new awards of recognition and requirements are created on a regular basis, the system must allow for quick change of the underlying data within the system.

SUMMARY OF THE INVENTION

The automated planning method of the present invention addresses the aforementioned needs in the art. The system automatically takes the earned achievements of an individual, which achievements can come from a wide variety of sources, and translates each achievement into an equivalent that can be used to satisfy the requirements for an award of recognition that is granted by an institution. The system performs translations for each institution. For a selected award within a particular institution, the system provides a listing of the requirements that have been met and the requirements that have not been for the particular award of recognition. The system is relatively simple to use and operate and is quickly updateable. As the automated planning system is computer-based, it is time and task efficient.

The automated planning system of the present invention is comprised of the steps of providing a work record having at least one work data element (achievement), and providing a database having a plurality of school files each having at least one degree (award of recognition) record having a plurality of second course elements. Each of the work data elements is translated into at least one first course element for each school file. A school file is selected as is a degree record from the selected school file. Each of the first course elements corresponding to the selected school file is compared against each of the second course elements of the selected degree record. A listing is made of each of the second course elements that have been matched by a first course element in a first section and each of the second course elements that have not been matched by a first course element in a second section. The work data element may include subentries selected from the group consisting of type of credit, date earned, description of work, work course number, length of credit, and level (lower level, upper level, graduate level, etc.,), wherein each of the second course elements that have been matched includes the type of credit subentry. Each work record may be located within one of a plurality of work files based on the type of credit work identifier data element subentry. The type of credit subentry may be selected from the group consisting of military credit, college credit, test credit, and correspondence credit. Each of the first course elements, may be derived from the American Council on Education Guide. In order to deal with award requirements that are electives, as opposed to specific courses, each of the second course elements is subdivided into a required course type and an elective course type, such that each of the first course elements has a first amount associated therewith and each of the second course elements of the elective course type has a second amount and an accumulator associated therewith, and wherein each of the first course elements is first compared against each second course element of the required course type and if no match is made, the first course element is compared against each of the second course elements of the elective course type and if a match is made, entering the first amount of the first course element into the accumulator of the second course element, and after all comparisons are made, for each of the second course elements of the elective course type wherein the accumulator is at least equal to the second amount of the second course element, listing the second course element in the first section and if the accumulator is less than the second amount, listing the second course element in the first section along with the accumulator and also listing the second course element along with the difference between the second amount and the accumulator, corresponding to the amount of each elective that has been met and the amount of each elective yet to be met.

BRIEF DESCRIPTION OF THE DRAWINGS

Figure 1:
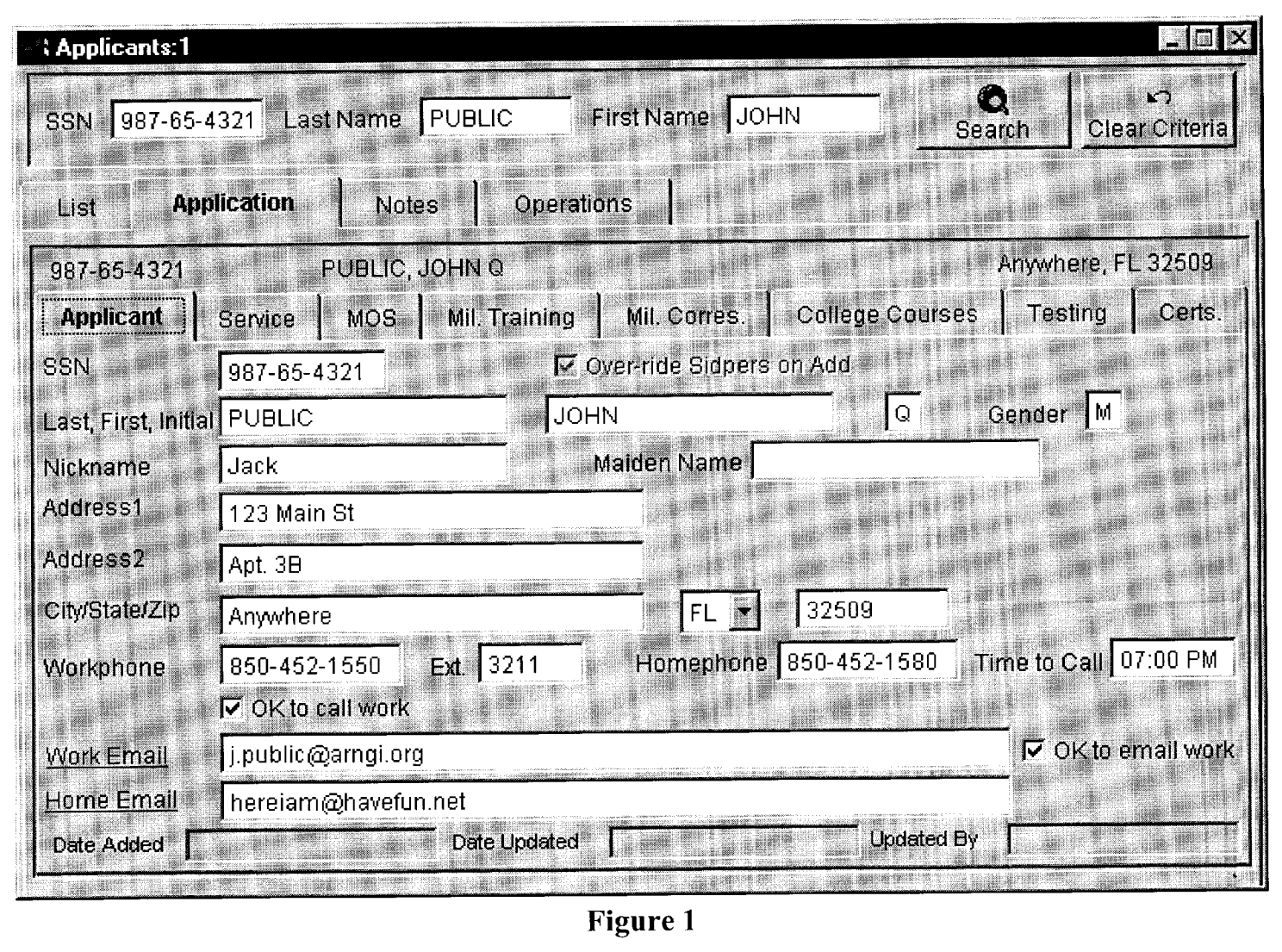

FIG. 1 illustrates the main page of the work record showing various information relating to the particular individual to which the work record relates.

Figure 2:
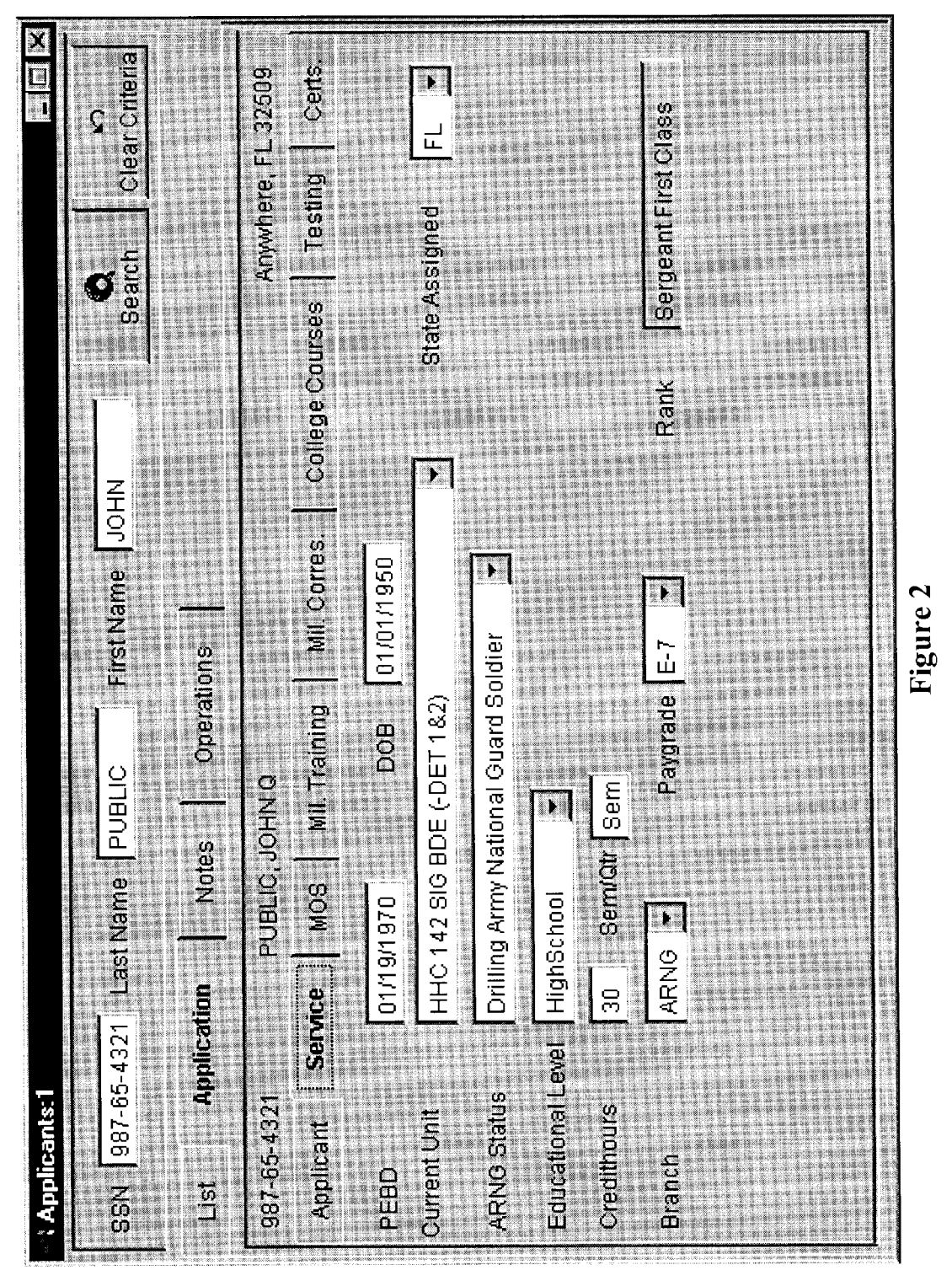

FIG. 2 illustrates the page of the work record that corresponds to the "Service" tab from within FIG. 1 and shows additional information relating to the individual.

FIG. 3 illustrates the page of the work record that corresponds to the "MOS" tab from within FIG. 1 and shows various entries for credit that the individual earned in the military as a military occupational specialty.

FIG. 4 illustrates the page of the work record that corresponds to the "Mil. Training" tab from within FIG. 1 and shows various entries credit that for the individual earned in standard military training.

Figure 5:
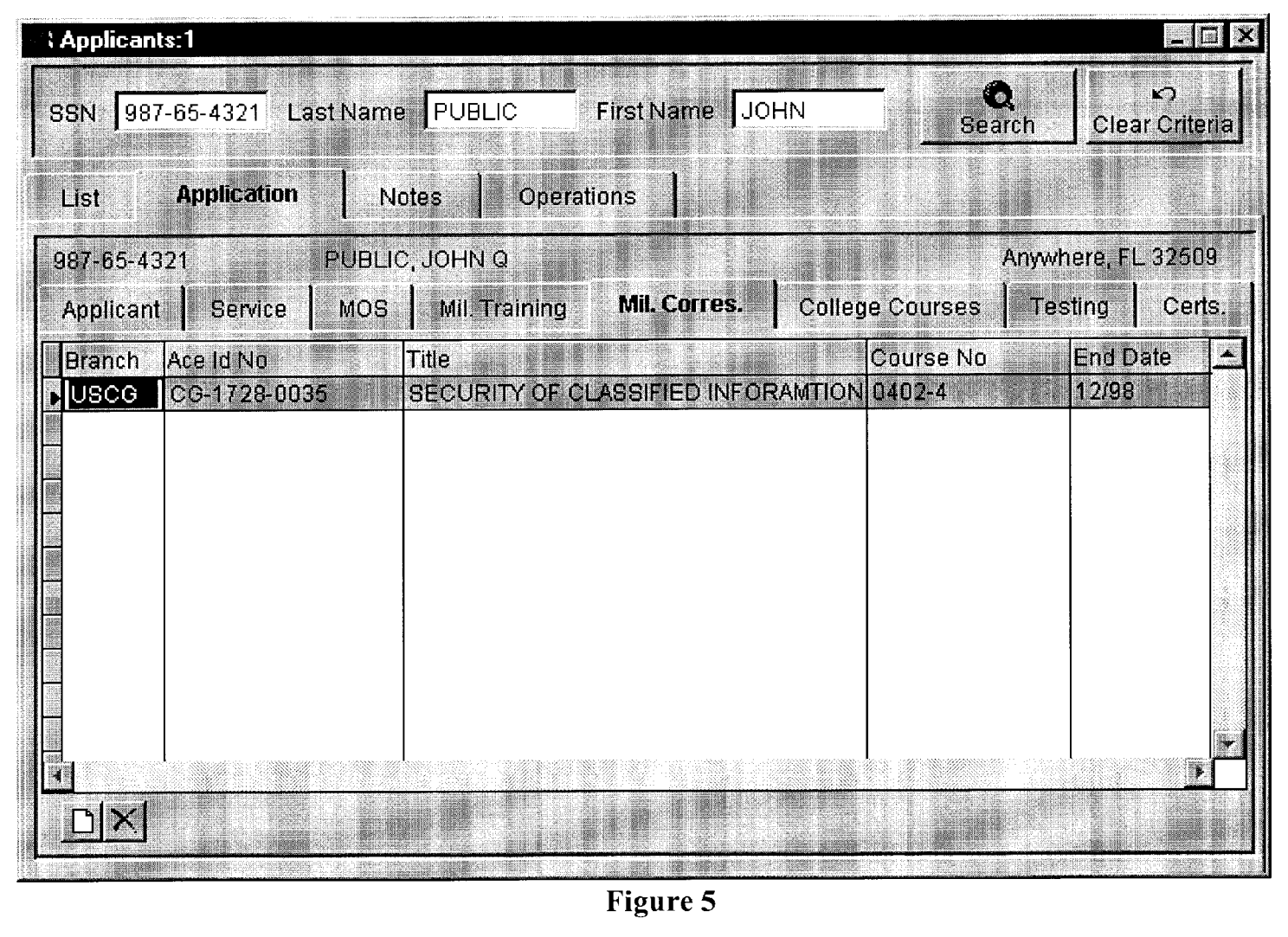

FIG. 5 illustrates the page of the work record that corresponds to the "Mil. Corres." tab from within FIG. 1 and shows various entries for credit that the individual earned from correspondence courses.

FIG. 6 illustrates the page of the work record that corresponds to the "College Courses" tab from within FIG. 1 and shows various entries for credit that the individual earned in college.

Figure 7:
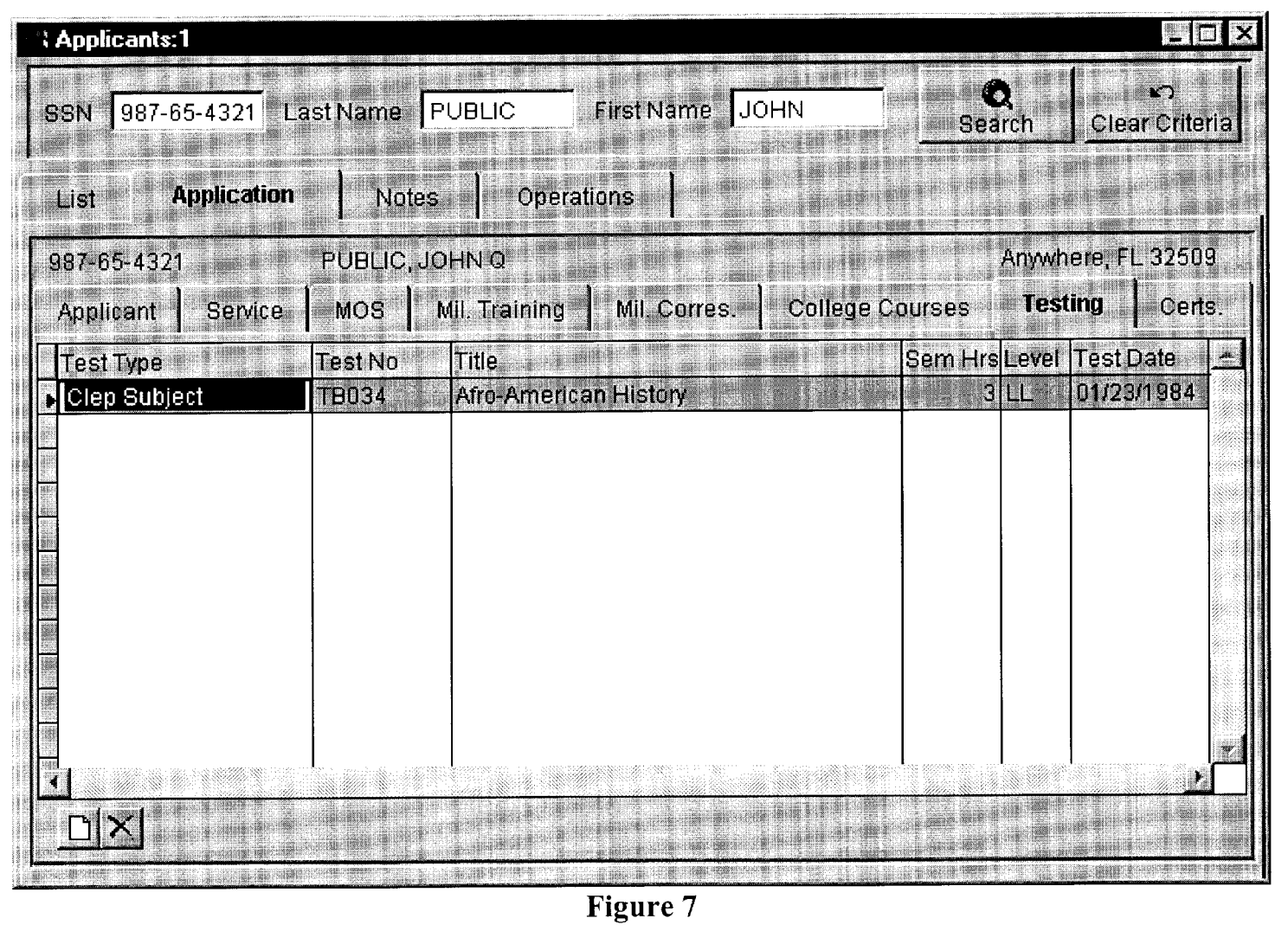

FIG. 7 illustrates the page of the work record that corresponds to the "Testing" tab from within FIG. 1 and shows various entries for credit that the individual earned through testing.

Figure 8:
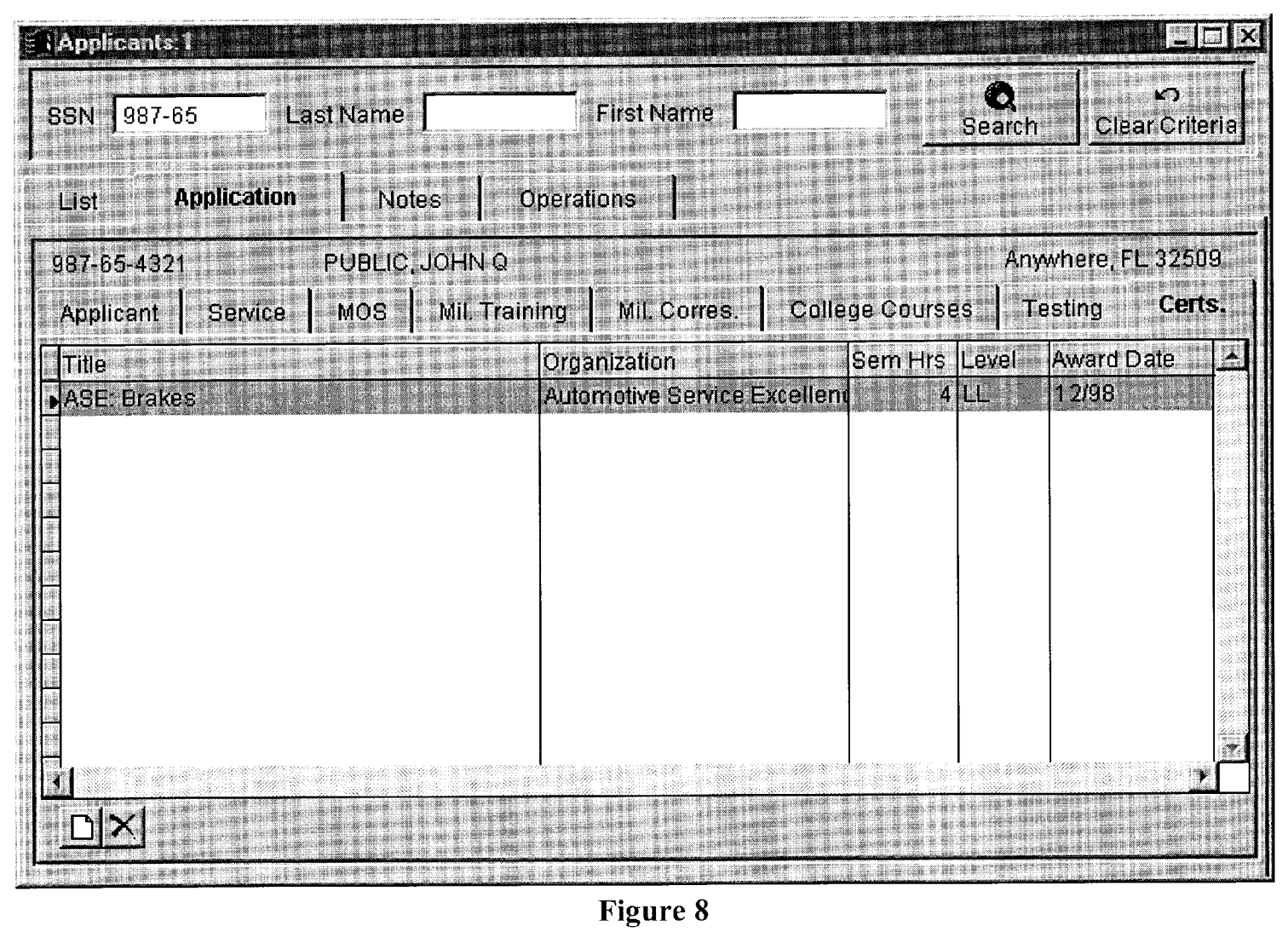

FIG. 8 illustrates the page of the work record that corresponds to the "Certs." tab from within FIG. 1 and shows various entries for certification that the individual possesses.

Figure 9:
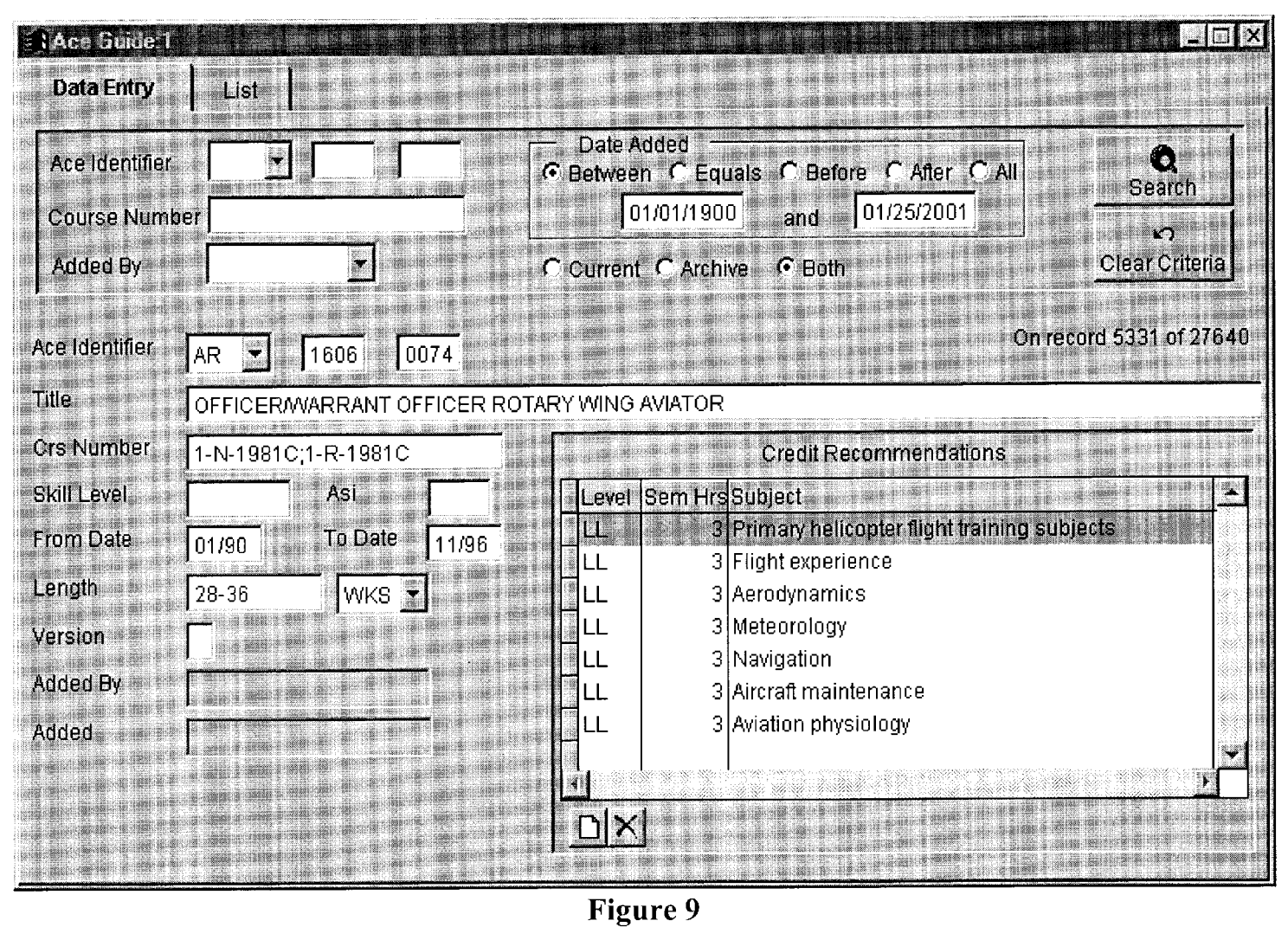

FIG. 9 illustrates a sample translation record of the translation subsystem of the automated planning system for each MOS and military training course that has been evaluated by the ACE showing the course being evaluated and the equivalent credit recommendations for the course.

FIG. 15 illustrates a user-friendly assessment listing of the individual from FIG. 14.

FIG. 16 is a second page of the illustration in FIG. 15.

FIG. 17 illustrates the credit assessment display that an operator of the system sees for allowing the operator to manually adjust the output and shows symbols for the area from wherein each credit was earned such as tanks for military credit, pen and pad for test credit and a building for college credit.

FIG. 18 illustrates the credit assessment display that can be given to the individual desirous of the award of recognition.

Similar reference numerals refer to similar parts throughout the several views of the drawings.

DESCRIPTION OF THE PREFERRED EMBODIMENT

Figure 10:
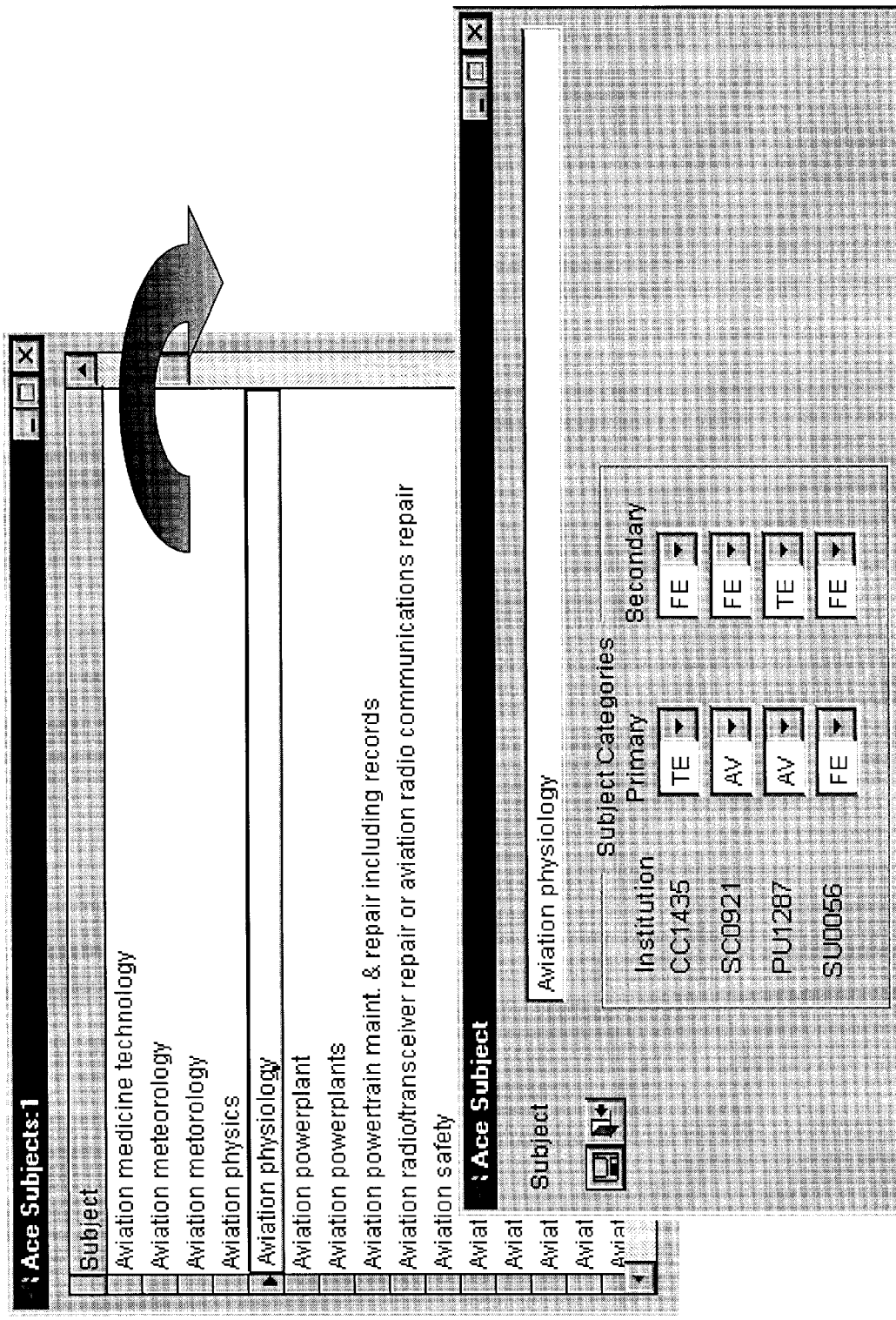
FIG. 10 illustrates a further level of the translation subsystem of the automated planning system showing the translation of each equivalent credit recommendation from FIG. 9 for each institution populated within the system and shows a primary translation and a secondary translation for each equivalent credit recommendation.
Figure 11:
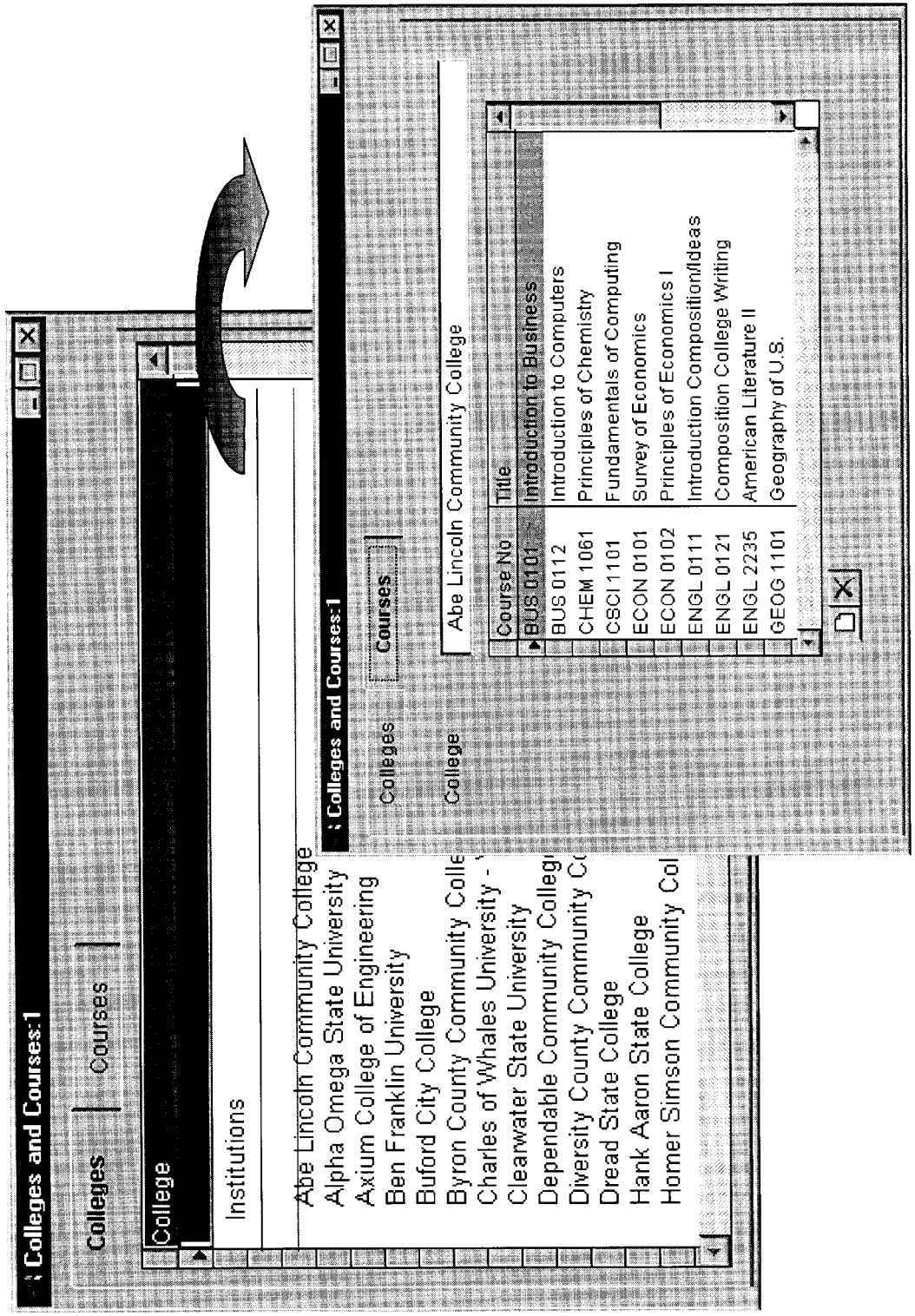
FIG. 11 illustrates that any college courses entered for an individual are also archived into the particular institutions records.
Figure 12:
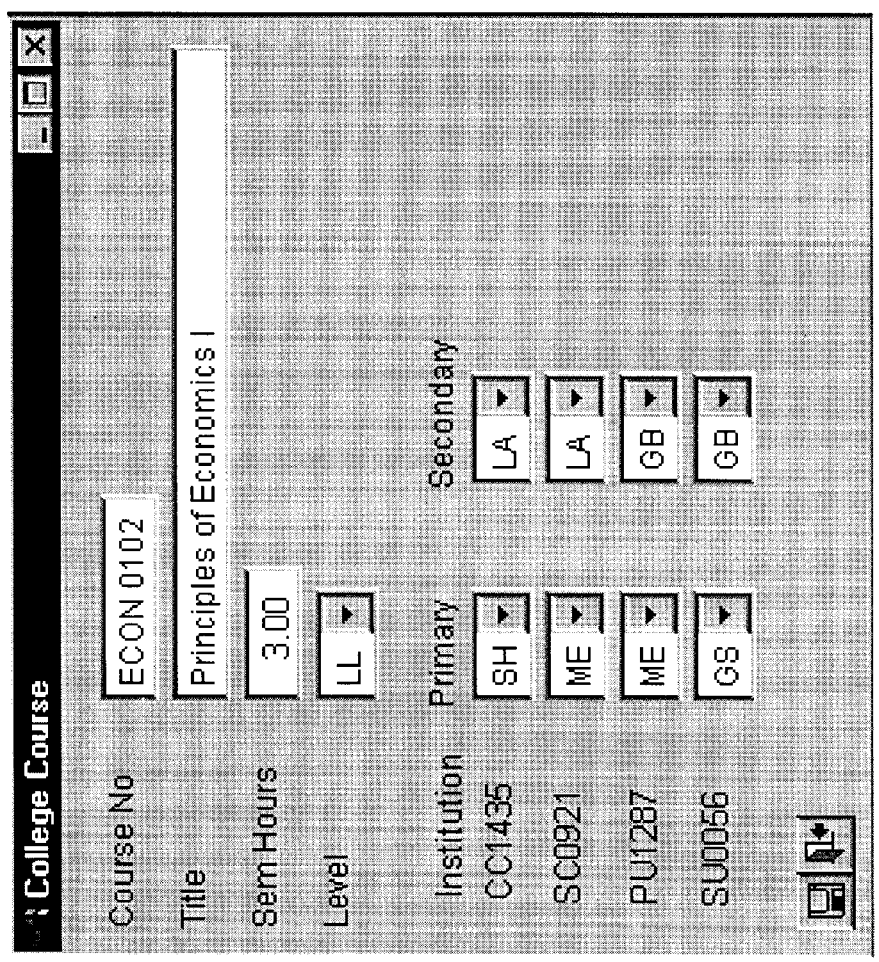
FIG. 12 illustrates the manner, within the translation subsystem, in which a college course is entered into the system and the primary and secondary translation determined by each institution within the system for the particular course being entered.
Figure 13:
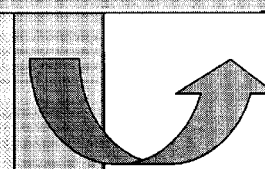
FIG. 13 illustrates the manner, within the translation subsystem, in which a test is entered into the system and the primary and secondary translation determined by each institution within the system for the particular course being entered.
Figure 14:
FIG. 14 illustrates a window that an operator of the system can use to draw an assessment of a particular individual's overall credit assessment or can determine an award of recognition plan.

Referring now to the drawings, it is seen that the automated planning system of the present invention is comprised of a computer-based system that performs the steps of providing a work record having at least one first entry, each first entry having a first work data element. The first work data element may have several entries including the type of credit, the date earned, the description of the work, the work course number, the length of credit (2 semester hours, 3 quarter hours, 12 weeks, etc.,) and the level achieved (upper level, lower level, graduate level, masters level, Ph.D. level, advanced level, beginners level, etc.). The work record is stored within a first database with each work record having an identifier key. Each work record corresponds to a particular individual such that the identifier key is unique to the individual (social security number, serial number, etc.) and each work record may have additional data corresponding to the individual such as address, telephone number, employment data, etc. As an individual earns an achievement, which may be job credit, military credit (which can be either regular training or military occupational specialty), college credit, test credit (an individual tests through a course), correspondence credit, and certification credit that individual's work record is retrieved and the achievement is entered into one of the first entries within that individual's work record with entries going into all appropriate subentries for the particular first work element. The first entries may be located in one large master record for each individual or may subdivided into various subentries such as MOS (military occupational specialty) subentry (which is experimental learning assessments and which can include such entries as the ACE (American Council on Education identification number of the credit), the branch of service wherein the credit was earned, the beginning date, the ending date, the MOS rating of the credit, the title of the achievement, and the skill level), a military training subentry (which can include such entries as branch of service wherein the credit was earned, the ACE identification number of the credit, the title of the achievement, the course number, the ending date, and the length), a correspondence course subentry (which can include such entries as the entity or branch of military service from which the credit was earned, the ACE identification number, the title of the achievement, the course number, and the ending date), a college course work subentry (which can include the college where the credit was earned, the course number, the title, the length in hours in appropriate units such as semester hours, quarter hours, etc., and the level (upper lower, graduate, etc.,), a testing subentry (which can include the test type, the test number, the test title, the length in hours, the level of the hours, and the test date, and a certification subentry, which can include such entries as the title of the certification, the organization that granted the certification, the length in hours, the level of the hours, and the award date.

A second database (which may be a simple translation table or series of tables) is provided and has a plurality of second entries with each second entry having a second work data element, and if desired some or all of the same subentries found in the first entries of the work record. Each second entry also contains a second work element, a first school ID element, a first course element, a first elective element, and a first amount element. Each entry of the second database is populated by requirements data from a single institution which correspond to a particular achievement. As an example, if the achievement earned by a person is 18 weeks of aeromedical physiology (which will be an entry, including appropriate subentries, in the first entry of the work record), then Institution A will have a second entry in the second database with 18 weeks of aeromedical physiology in the second work data element, an "A" in the first school ID element, a "4329" entry in the first course element, a null entry in the first elective element, and a 3 entry in first amount element. This means that Institution A translates 18 weeks of aeromedical physiology into 3 hours of course 4329 (upper level aviation physiology). Institution B will have a second entry in the second database with 18 weeks of aeromedical physiology in the second work data element, a "B" in the first school ID element, a null entry in the first course element a "science" entry in the first elective element, and a 3 entry in first amount element. This means that Institution B translates 18 weeks of aeromedical physiology into 3 hours of science electives.

The population may come from any desired source, for example, in an academic or military setting, each second entry can be populated from American Council on Education Guide.

Additionally, a particular institution may make more than one translation of a given achievement. If such is the case, then the second entry will also have a first degree element (the term degree is generic for any type of grant of recognition that an institution may grant including academic degrees, diplomas, certificates of completion, certificates of competency, licenses, among others). For example, if the achievement earned by a person is 18 weeks of aeromedical physiology (which will be an entry in the first entry of the work record), then Institution A will have a second entry in the second database with 18 weeks of aeromedical physiology in the second work data element, an "A" in the first school ID element, a "4329" entry in the first course element, a null entry in the first elective element, a 3 entry in first amount element, and a "BSAE" in the first degree element. This means that Institution A translates 18 weeks of aeromedical physiology into 3 hours of course 4329 (upper level aviation physiology) in the Bachelor of Science in Aeronautical Engineering program. Institution A will have another second entry in the second database with 18 weeks of aeromedical physiology in the second work data element, an "A" in the first school ID element, a null entry in the first course element, a "science" entry in the first elective element, a 3 entry in first amount element, and a "BSEE" in the first degree element. This means that Institution A translates 18 weeks of aeromedical physiology into 3 hours of science electives in the Bachelor of Science in Electrical Engineering program.

An individual work record is retrieved and each first entry stored within the work record is compared against the second database such that when the first data work element matches a second data work element, then the first school element, the first course element, the first elective element, and the first amount are retrieved and stored as more fully described below. If the first degree element is not used within the second entry, meaning that each institution translates a given first data work element into exactly one second entry, then the next first entry is retrieved and the process is repeated until all first entries have been compared. If the second entry uses a first degree element, meaning that each institution translates a first work data element into one or more second entries, then the original first entry is compared against all second entries before the next first entry is retrieved and the process is repeated until all first entries have been compared. In this case, the first degree element is also retrieved and stored whenever a first work data element matches a second data work element.

The retrieved results of the translation can be stored in one of two general manners. In the first approach, all retrieved results are stored as a single listing (such as in a single record) that is associated with the particular work record. In the second approach, one or more files are created with each file having a second school ID element which identifies a particular institution and all second entries that are retrieved are only stored within the file that has a second school ID element that matches the first school ID element of the retrieved second entry. Other storage methods are possible and the particular method is dependent on the particular hardware and software platforms being used to implement the automated planning method of the present invention. In each manner, a third entry is provided and contains, a second course element, a second elective element, a second amount element, and if used, a second degree element and each element from a particular retrieved second entry is stored in the corresponding element of a third entry, and if the first storage method is used, a second school ID element.

A third database is provided and has at least one file, which corresponds to a particular institution, having a third school ID element, each file having at least one fourth record having a third degree element, which fourth record corresponds to a particular degree, each fourth record having at least one fourth entry which fourth entry has a fourth course element. Additionally, in order to accommodate electives, for some or all of the files the fourth record may have a fifth entry, each fifth entry having a fourth elective element, a fourth amount element, and an accumulator.

In order for a person to use the automated planning system of the present invention, the person's particular work record is retrieved and each first entry is translated via the second database and the results are stored as described above. The file corresponding to the particular institution of interest to the individual file is selected and the fourth record corresponding to the desired degree is selected. If the third entries are stored using the first described storage method, then all third entries are retrieved and if the second storage method is used, only the third entries stored within the file having a second school ID element that matches the third school ID element are retrieved. Each retrieved third entry is compared against each fourth entry, and if a match is found this fourth entry is appropriately tagged. If no match is found, then the particular third entry is compared against each fifth entry and if a match is found, adding the second amount element into the accumulator, which is initially set at zero prior to use. Once the accumulator is equal to or greater than the third amount element, the particular fifth entry is tagged and if desired, appropriately disabled so this that no further comparisons are made against this fifth entry by the remaining third entries. Each retrieved third entry is compared in turn. Thereafter, each tagged fourth entry, meaning each fourth entry that was matched by a third entry and thus the individual achieved this particular course required for the chosen degree, is listed in a first manner as is each tagged fifth entry, meaning the individual achieved this particular elective requirement for the degree chosen. Each fourth entry that was not tagged is listed in a second manner meaning the individual must still achieve this particular course required for the chosen degree. For each fifth entry that was tagged, the fifth entry is entered in the first manner, otherwise the fifth entry is listed in the second manner.

The first manner and the second manner of listing the fourth entries and the fifth entries may be any appropriate fashion for listing requirements that have been met and requirements that have yet to be met. For example, all entries to be listed in the first manner can be at the top of a display element (video display device, printed page, etc.), and the remainder can be at the bottom. Alternately, each fourth entry and each fifth entry are listed by some specified order (alphabetically, by course number, etc.), and a first type of symbol, a check mark for example, can denote all entries that are listed in the first manner, and a second type of symbol, an X or a lack of a check for all entries that are listed in the second manner, or each entry can have the number of units needed and the number of units achieved, etc. Additionally, a listing may be provided, such as illustrated in FIGS. 15 and 16, so that an operator or the individual who is the target of the assessment can review the entire entry for the particular individual. Additionally, the listings may be manipulated by the operator in order to correct any errors or to manipulate any output in order to optimize the amount of credit given to an individual as permitted by the rules of each particular institution.

Each database within the automated planning method is readily changeable by the appropriate personal responsible for that particular database While the invention has been particularly shown and described with reference to embodiments thereof, it will be appreciated by those skilled in the art that various changes in form and detail may be made without departing from the spirit and scope of the invention.

I claim:

1. A computer-based automatic planning method comprising the steps:
   providing a work record having at least one work data element;
   translating each of the work data element into at least one first course element;
   providing a school record having a plurality of second course elements;
   comparing each of the first course elements against each of the second course elements;
   listing each of the second course elements that having been matched by a first course element in a first section and listing each of the second course elements that have not been matched by a first course element in a second section; and
   wherein each of the second course elements is subdivided in a required course type and an elective course type, such that each of the first course elements has a first amount associated therewith and each of the second course elements of the elective course type has a second amount and an accumulator associated therewith, and wherein each of the first course elements is first compared against each second course element of the required course type and if no match is made, the first course element is compared against each of the second course elements of the elective course type and if a match is made, entering the first amount of the first course element into the accumulator of the second course element, and after all comparisons are made, for each of the second course elements of the elective course type wherein the accumulator is at least equal to the second amount of the second course element, listing the second course element in the first section and if the accumulator is less than the second amount, listing the second course element in the first section along with the accumulator and also listing the second course element alone with the difference between the second amount and the accumulator.

2. The method as in claim 1 wherein the work data element includes subentries selected from the group consisting of type of credit, date earned, description of work, work course number, length of credit, and level.

3. The method as in claim 2 wherein each of the second course elements that have been matched includes the type of credit subentry.

4. The method as in claim 2 wherein each work record is located within one of a plurality of work files based on the type of credit work identifier data element subentry.

5. The method as in claim 2 wherein the type of credit subentry is selected from the group consisting of work credit, military credit, college credit, test credit, and correspondence credit.

6. The method as in claim 1 wherein the first course element, is derived from the American Council on Education Guide.

7. The method as in claim 1 wherein each of the second course elements is subdivided in a required course type and an elective course type, such that each of the first course elements has a first amount associated therewith and each of the second course elements of the elective course type has a second amount and an accumulator associated therewith, and wherein each of the first course elements is first compared against each second course element of the required course type and if no match is made, the first course element is compared against each of the second course elements of the elective course type and if a match is made, entering the first amount of the first course element into the accumulator of the second course element, and after all comparisons are made, for each of the second course elements of the elective course type wherein the accumulator is at least equal to the second amount of the second course element, listing the second course element in the first section and if the accumulator is less than the second amount, listing the second course element in the first section along with the accumulator and also listing the second course element along with the difference between the second amount and the accumulator.

8. A computer-based automatic planning method comprising the steps:
   providing a work record having at least one work data element;
   providing a database having a plurality of school files each having at least one degree record having a plurality of second course elements;
   translating each of the work data element into at least one first course element for each school file;
   selecting a school file and a degree record from the school file and comparing each of the first course elements for the selected school file against each of the second course elements of the selected degree record;
   listing each of the second course elements that having been matched by a first course element in a first section and listing each of the second course elements that have not been matched by a first course element in a second section; and
   wherein each of the second course elements is subdivided in a required course type and an elective course type, such that each of the first course elements has a first amount associated therewith and each of the second course elements of the elective course type has a second amount and an accumulator associated therewith, and wherein each of the first course elements is first compared against each second course element of the required course type and if no match is made, the first course element is compared against each of the second course elements of the elective course type and if a match is made, entering the first amount of the first course element into the accumulator of the second course element, and after all comparisons are made, for each of the second course elements of the elective course type wherein the accumulator is at least equal to the second amount of the second course element, listing the second course element in the first section and if the accumulator is less than the second amount, listing the second course element in the first section alone with the accumulator and also listing the second course element along with the difference between the second amount and the accumulator.

9. The method as in claim 8 wherein the work data element includes subentries selected from the group consisting of type of credit, date earned, description of work, work course number, length of credit, and level.

10. The method as in claim 9 wherein each of the second course elements that have been matched includes the type of credit subentry.

11. The method as in claim 9 wherein each work record is located within one of a plurality of work files based on the type of credit work identifier data element subentry.

12. The method as in claim 9 wherein the type of credit subentry is selected from the group consisting of work credit, military credit, college credit, test credit, and correspondence credit.

13. The method as in claim 8 wherein the first course element, is derived from the American Council on Education Guide.

14. The method as in claim 8 wherein each of the second course elements is subdivided in a required course type and an elective course type, such that each of the first course elements has a first amount associated therewith and each of the second course elements of the elective course type has a second amount and an accumulator associated therewith, and wherein each of the first course elements is first compared against each second course element of the required course type and if no match is made, the first course element is compared against each of the second course elements of the elective course type and if a match is made, entering the first amount of the first course element into the accumulator of the second course element, and after all comparisons are made, for each of the second course elements of the elective course type wherein the accumulator is at least equal to the second amount of the second course element, listing the second course element in the first section and if the accumulator is less than the second amount, listing the second course element in the first section along with the accumulator and also listing the second course element along with the difference between the second amount and the accumulator.

15. An automated planning method comprising the steps:
providing a first database having a first record, the first record having at least one first entry, each first entry having a first work data element;
providing a second database having a plurality of second entries, each second entry having a second work data element, a first school ID element, a first course element, a first elective element, and a first amount element;
providing a third database having at least one second record, each second record having a second school ID element and having at least one third entry, each third entry having a second course element, a second elective element, and a second amount element;

taking each first entry in turn from the first record and comparing the first work data element from the first entry against the second work data element of each second entry, in turn, of the second database and when the first work data element matches the second work data element, selecting the second record that has a second school ID element that matches the first school ID element, and entering the first course element the first elective element, and the first amount element of the second entry of the second database into the a third entry of the selected second record;

providing a fourth database having at least one file having a third school ID element, each file having at least one fourth record, each fourth record having a plurality of fourth entries, each fourth entry having a third course element, the fourth record also having at least one fifth entry having a third elective element, a third amount element, and an accumulator; and selecting a file and selecting a fourth record from the file, and taking each third entry in turn wherein the second school ID element matches the third school ID element and comparing the second course element of each such third entry against the third course element for a match and listing each third course element that is matched in a first manner, for each second course element that fails to match a third course element, comparing the second elective element against each third elective element for a match and if a match is made adding the second amount into the accumulator, for each third elective element wherein the accumulator is at least equal to the third amount, listing the third elective element in the first manner and wherein the accumulator is less than the third amount listing the third elective in a second manner and listing each third course element that is not matched in the second manner.

16. The method as in claim 15 wherein the work data element includes subentries selected from the group consisting of type of credit, date earned, description of work, work course number, length of credit, and level.

17. The method as in claim 16 wherein each entry listed within the first section includes the type of credit subentry.

18. The method as in claim 16 wherein each first record within the first database is located within one of a plurality of work files based on the type of credit work identifier data element subentry.

19. The method as in claim 16 wherein the type of credit subentry is selected from the group consisting of work credit, military credit, college credit, test credit, and correspondence credit.

20. The method as in claim 15 wherein each of the steps are performed by a computer.

21. The method as in claim 15 wherein each of the files corresponds to a unique institution and each of the fourth records within the file corresponds to a unique degree within the institution.

22. The method as in claim 15 wherein each of the second elective elements include a first level subelement and each of the third elective elements include a second level subelement.

23. The method as in claim 15 wherein the first course element, the first elective element, and the first amount element of each of the second entries is populated from the American Council on Education Guide.

24. The method as in claim 15 wherein each third entry further has a first degree element and each fourth record has a second degree element and wherein each third entry is compared against each second course element only if additionally, the first degree element matches the second degree element of the selected fourth record.

25. An automated planning method comprising the steps:

providing a first database having a first record, the first record having an identifier key and at least one first entry, each first entry having a first work data element;

providing a second database having a plurality of second entries, each second entry having a second work data element, a first school ID element, a first course element, a first elective element, and a first amount element;

providing a second record having at least one third entry, each third entry having a second school ID element, a second course element, a second elective element, and a second amount element;

using the second database, translating each first entry stored within the first record and entering the result in the into a third entry of the second record;

providing a third database having at least one file having a third school ID element, each file having at least one fourth record, each fourth record having a plurality of fourth entries, each fourth entry having a third course element, the second record also having at least one fifth entry having an third elective element, a third amount element, and an accumulator; and selecting a file and selecting a fourth record from the file, and taking each third entry in turn wherein the second school ID element matches the third school ID element and comparing the second course element of each such third entry against the third course element for a match and listing each third course element that is matched in a first manner, for each second course element that fails to match a third course element, comparing the second elective element against each third elective element for a match and if a match is made adding the second amount into the accumulator, for each third elective element wherein the accumulator is at least equal to the third amount, listing the third elective element in the first manner and wherein the accumulator is less than the third amount listing the third elective in a second manner and listing each third course element that is not matched in the second manner.

26. The method as in claim 25 wherein the work data element includes subentries selected from the group consisting of type of credit, date earned, description of work, work course number, length of credit, and level.

27. The method as in claim 26 wherein each entry listed within the first section includes the type of credit subentry.

28. The method as in claim 26 wherein each first record within the first database is located within one of a plurality of work files based on the type of credit work identifier data element subentry.

29. The method as in claim 26 wherein the type of credit subentry is selected from the group consisting of work credit, military credit, college credit, test credit, and correspondence credit.

30. The method as in claim 25 wherein each of the steps are performed by a computer.

31. The method as in claim 25 wherein each of the files corresponds to a unique institution and each of the fourth records within the file corresponds to a unique degree within the institution.

32. The method as in claim 25 wherein each of the second elective elements include a level subelement and each of the third elective elements include a second level subelement.

33. The method as in claim 25 wherein the first course element, the first elective element, and the first amount element of each of the second entries is populated from the American Council on Education Guide.

34. The method as in claim 25 wherein each third entry further has a first degree element and each fourth record has a second degree element and wherein each third entry is compared against each second course element only if additionally, the first degree element matches the second degree element of the selected fourth record.

* * * * *